(12) United States Patent
Larsen et al.

(10) Patent No.: US 9,020,063 B2
(45) Date of Patent: Apr. 28, 2015

(54) AUTOMATIC FREQUENCY SHIFT KEYING (FSK) TUNING CIRCUIT FOR A HEARING AID AND METHOD

(71) Applicant: Widex A/S, Lynge (DK)

(72) Inventors: Soren Mollskov Larsen, Varlose (DK); Niels Ole Knudsen, Humlebak (DK)

(73) Assignee: Widex A/S, Lynge (DK)

( * ) Notice: Subject to any disclaimer, the term of this patent is extended or adjusted under 35 U.S.C. 154(b) by 0 days.

(21) Appl. No.: 14/278,384

(22) Filed: May 15, 2014

(65) Prior Publication Data

US 2014/0241556 A1 Aug. 28, 2014

Related U.S. Application Data

(63) Continuation-in-part of application No. PCT/EP2011/071040, filed on Nov. 25, 2011.

(51) Int. Cl.
*H04L 27/10* (2006.01)
*H04R 25/00* (2006.01)
*H04L 27/14* (2006.01)
*H04L 27/12* (2006.01)
*H04L 27/156* (2006.01)
*H04R 3/00* (2006.01)

(52) U.S. Cl.
CPC .............. *H04R 25/50* (2013.01); *H04L 27/14* (2013.01); *H04R 25/554* (2013.01); *H04R 2225/51* (2013.01); *H04R 2225/55* (2013.01); *H04L 27/12* (2013.01); *H04L 27/1563* (2013.01); *H04R 3/00* (2013.01)

(58) Field of Classification Search
CPC ..... H04L 27/14; H04L 27/12; H04L 27/1563; H04R 25/554; H04R 25/50; H04R 3/00; H04R 2225/51; H04R 2225/55
USPC ........................................ 375/272; 381/316
See application file for complete search history.

(56) References Cited

U.S. PATENT DOCUMENTS

| | | | |
|---|---|---|---|
| 2,653,243 A | 8/1948 | McClellan | |
| 5,450,086 A | 9/1995 | Kaiser | |
| 2003/0139168 A1* | 7/2003 | Sorrells et al. | 455/333 |

(Continued)

FOREIGN PATENT DOCUMENTS

| | | |
|---|---|---|
| EP | 0663724 A2 | 7/1995 |
| JP | 2006-33584 A | 2/2006 |

(Continued)

OTHER PUBLICATIONS

International Search Report with Written Opinion of ISA for PCT/EP2011/071040 dated Mar. 26, 2012.

*Primary Examiner* — Juan A Torres
(74) *Attorney, Agent, or Firm* — Sughrue Mion, PLLC (57) ABSTRACT

An frequency shift keying (FSK) transceiver for use in a hearing aid is capable of automatic tuning of the transceiver frequency. The automatic tuning makes use of a phase difference detector and a tuning manager adapted to control the frequency of a resonant circuit of the FSK transceiver according to information received from the phase difference detector. The phase difference detector measures the phase difference across a component of the resonant circuit of the FSK transceiver. If the phase difference of a binary FSK symbol is equal to the phase difference of the opposite binary FSK symbol, the resonant circuit is tuned, otherwise the tuning manager performs a tuning procedure in order to minimize the difference in phase differences, and adjusts the frequency of the resonant circuit accordingly.

10 Claims, 7 Drawing Sheets (56) References Cited

U.S. PATENT DOCUMENTS

2011/0111706 A1* 5/2011 Noel ............................ 455/77
2011/0243277 A1* 10/2011 Noel ............................ 375/334

FOREIGN PATENT DOCUMENTS

WO  2009/156879 A1  12/2009
WO  2010/058324 A2  5/2010

* cited by examiner

AUTOMATIC FREQUENCY SHIFT KEYING (FSK) TUNING CIRCUIT FOR A HEARING AID AND METHOD

CROSS REFERENCE TO RELATED APPLICATIONS

The present application is a continuation-in-part of International application No. PCT/EP2011071040, filed on Nov. 25, 2011, published as WP-A1-2013075758, which is incorporated by reference herein in its entirety.

BACKGROUND OF THE INVENTION

This application relates to hearing aids. More specifically, it relates to hearing aids having means for wireless, digital communication. The application also relates to a method for tuning the frequency of a resonant circuit of a frequency shift keying (FSK) transceiver.

FIELD OF THE INVENTION

A hearing aid is to be understood as a small, electronic device designed to be worn behind or in the ear of a person suffering from a hearing impairment. The main purpose of the hearing aid is to amplify sounds from the environment by an amount sufficient for perception by the hearing aid user. The sounds are usually picked up by a microphone in the hearing aid, processed electronically by the hearing aid signal processor, and reproduced by an acoustic output transducer in the hearing aid. The amplification is individually fitted to the hearing-impaired user by a professional hearing aid fitter according to a prescription based on an audiogram of the user's hearing ability. By applying the prescription to the hearing aid amplifier it is possible to compensate for a hearing loss by amplifying the frequency ranges impaired by the hearing loss. For flexibility reasons, the signal processor in the hearing aid is preferably a digital signal processor.

Contemporary hearing aids often comprise short-range transceivers for allowing wireless, two-way communication with external equipment. Many types of wireless communication with hearing aids are utilized, such as programming the hearing aid to a prescription for compensating a hearing loss, remote controlling the hearing aid from a pocket-sized device carried by the hearing aid user, streaming of audio signals from an external device to the hearing aid for reproduction, and mutual communication between two hearing aids, e.g. streaming of audio signals between the hearing aids.

The type of wireless communication employed in hearing aids is preferably digital, as this implies several benefits over analog communication, e.g. better noise immunity, the possibility of implementing effective error-correction of the transmitted signals, and the elimination of the need for separate A/D or D/A conversion of transmitted signals when digital hearing aids are employed. A very power-effective method of digital, wireless communication is the transmission of an FSK-modulated digital bit stream. Power efficiency is an important design factor in battery-powered hearing aids, where the energy density and lifespan of the battery is very limited due to the narrow physical constraints.

A radio circuit for use in a hearing aid has to meet the physical constraints of the hearing aid. It has to be very small, i.e. a few millimeters on each side, it must have modest power requirements, and it should emit as much electromagnetic power as possible in order to be capable of transmitting at an acceptable range. An inductive radio with a resonant circuit comprising an inductance and a capacitance is the preferred type of tuned radio circuit in hearing aid applications due to the fact that the inductance may perform the duty of the antenna of the radio, thus saving space. Such a radio transceiver is preferably adapted to receive and transmit alternating at the same frequency, i.e. half duplex, thus eliminating the need for more than one transmission channel, diplexer problems resulting from the use of more than one frequency, and the need for antenna retuning.

An inductive radio is highly dependent on being tuned precisely to its operating frequency in order to be able to receive and transmit radio signals in an efficient manner. The tuning, which is supposed to be fixed for the operational lifespan of the hearing aid, is of course dependent on the component values of the inductance coil and the resonator capacity, respectively, and ideally this tuning would be made at the manufacturing stage of the antenna coil. However, the parasitic capacitance of the operational hearing aid circuit has a profound impact on the operating frequency of the inductive radio, and some means of final tuning of the frequency of the inductive radio prior to leaving the hearing aid factory is therefore necessary.

THE PRIOR ART

One known method of tuning the frequency of the inductive radio of a hearing aid involves a tunable capacitance element disposed in the hearing aid and a dedicated calibration rig capable of providing suitable, wireless test signals to the hearing aid. The tunable capacitance element in the hearing aid is preferably embodied as a digitally tunable bank of capacitors, wherein a series of electronic switches controls the total capacity of the bank of capacitors by opening or closing the connection of individual capacitors in the bank of capacitors, thus creating a step-wise tunable capacitance element. The electronic switches of the bank of capacitors are preferably controlled by a latch, enabling e.g. an 8-bit latch to provide a tunable capacitance element with 256 discrete capacitance values for the inductive radio. The benefit of a digitally tunable capacitor bank is that it is easily implemented as part of an integrated circuit incorporating the hearing aid signal processor itself, thus saving space.

The procedure for calibrating the tuning of the inductive radio circuit of the hearing aid is roughly as follows: A hearing aid is placed in the calibration rig and powered on. A radio transceiver in the calibration rig placed at close proximity to the hearing aid transmits an acknowledge request to the hearing aid receiver at a frequency in the vicinity of the expected frequency of the hearing aid radio transceiver. The hearing aid responds by transmitting an acknowledge message to the transceiver in the calibration rig, the message including a hearing aid identification code and the present value of the tunable capacitance element.

Upon reception of the acknowledge message from the hearing aid, the calibration rig transmits an instruction to the hearing aid to enter a dedicated service mode, set the value of its capacitance element to e.g. the lowest possible value and return an acknowledge message to the calibration rig. While receiving the acknowledge message, the calibration rig performs a measurement of the voltage on the transmitter antenna of the signal transmitted from the hearing aid. This voltage is inversely proportional to the distance to the resonance frequency. The calibration rig now performs a coarse adjustment of the hearing aid transceiver frequency by entering a loop where the calibration rig traverses e.g. every tenth possible value of the capacitor bank in the hearing aid, transmitting instructions to the hearing aid to update the value of its capacitor bank and issue an acknowledge message, the calibration rig measuring the voltage at the nominal transmission frequency at every step in the process. During this coarse adjustment, the calibration rig maps out a table of measured voltages versus capacitance values.

By examining the table results, the calibration rig looks for the capacitance value corresponding to the highest voltage measured. The calibration rig then performs a fine adjustment of the hearing aid transceiver frequency by entering the loop again, now starting at a capacitance value e.g. 20% below the capacitance value corresponding to the highest voltage measured and traversing every single capacitance value up to a capacitance value e.g. 20% above the capacitance value corresponding to the highest voltage measured, mapping out the measured voltages versus capacitance values in the process.

The calibration rig determines the optimal capacitance value by analyzing the table and finding the capacitance value corresponding to the highest voltage measured during the calibration process. At this capacitance value, the voltage from that particular hearing aid is as high as possible, and the operating frequency of the hearing aid transceiver as close to the nominal transmission frequency as possible. The calibration rig then concludes the calibration procedure by transmitting the found, optimal capacitance value to the hearing aid, storing the capacitance value in its internal database together with the identification code of the hearing aid, and issuing a command ordering the hearing aid to leave its service mode. The hearing aid stores the optimal capacitance value in its internal memory, and is now calibrated to the nominal transmission frequency. This calibration procedure takes about 15 to 25 seconds per hearing aid to perform.

Although the calibration procedure is reliable for ensuring correct calibration of the radio transceiver frequency of a hearing aid, it is still considered to be slow and cumbersome as it involves the employment of an external calibration rig during manufacture in order to perform transceiver frequency calibration. If the calibrated frequency of the hearing aid transceiver should change for some reason, e.g. a change in the environment, the hearing aid needs to be recalibrated at a service facility possessing a calibration rig in order to perform correctly. Environmental changes may originate from moisture, corrosive fluids, the presence of metals or electromagnetic interference.

The problem to be solved by the invention is therefore to devise a wireless hearing aid where calibrating or recalibrating the transceiver frequency may be performed without resolving to external equipment. A solution where transceiver frequency calibration is performed in a faster and more efficient manner by the hearing aid itself would be preferred.

WO-A2-2010058324 discloses a method and a system for determining a frequency offset of the carrier frequency of an oscillator in an FSK receiver. The method involves detecting zero-crossings for one or more combinations of I and Q signal pairs of an FSK-modulated bit stream, determining positive occurrences of at least one combination of I and Q signal pairs in a first direction, and determining negative occurrences of at least one combination of I and Q signal pairs in a second direction opposite the first direction. The total time between consecutive positive and negative occurrences are then measured and accumulated along with the total positive and negative occurrences. The positive occurrence ratio is compared to the negative occurrence ratio by a frequency control module, and the difference is used to adjust the frequency of the oscillator. The method is comparatively complicated, as it involves generation of eight phase references for reliably detection of zero crossings.

WO-A1-2009156879 discloses a method and a system for tuning an antenna for an FSK transceiver. The method involves receiving a first signal strength indicator indicating a first signal strength of a first data signal transmitted by an antenna on a lower FSK frequency, receiving a second signal strength indicator indicating a second signal strength of a second data signal transmitted by the antenna on a higher FSK frequency, determining a tuning control signal based on the difference between the first signal strength indicator and the second signal strength indicator, and tuning the antenna based on the control signal. This method requires two signal strength indicators in order to determine the tuning control signal. If the distance between the transmitter and the receiver becomes too large, the difference between the two signal strengths will get too small to provide the receiver with an adequate control signal, and the tuning may thus be prone to drifting. The method described by WO-A1-2009156879 is therefore considered unsuitable for tuning the antenna in a transceiver system involving hearing aids, where the desired maximum operating range is at least one meter.

U.S. Pat. No. 5,450,086 discloses a self-tuning FSK receiver for use with a multi-frequency FSK transmitter. The self-tuning mechanism of the FSK receiver has means for traversing through a plurality of predetermined, discrete reception frequencies until an active reception frequency is found. No means for fine-tuning the receiver frequency in the event of frequency drifting is proposed or mentioned by U.S. Pat. No. 5,450,086.

SUMMARY OF THE INVENTION

According to a first aspect of the invention, a frequency-shift-keying transceiver for use in a hearing aid is devised, the transceiver having a resonant circuit comprising at least a fixed inductance, a fixed capacitance and a variable capacitance, wherein the transceiver comprises an FSK modulator, a transmitting amplifier, a receiving amplifier and means for controlling the tuning frequency of the resonant circuit to a desired frequency, said tuning means comprising a phase difference detector and a tuning manager, the phase difference detector being adapted for measuring the phase difference across the fixed capacitance, the tuning manager comprising means for receiving symbols from a transmission data buffer, means for receiving measured phase differences from the phase difference detector, means for comparing a first phase difference corresponding to a first, received symbol with a second phase difference corresponding to a second, received symbol and means for adjusting the value of the variable capacitance according to the difference between the first phase difference and the second phase difference in order to control the tuning frequency of the resonant circuit.

The hearing aid transceiver uses a measurement of the phase shift across a component in the resonant circuit, such as a capacitor, as a measure of the tuning frequency, and exploits the fact that the phase shift difference from 90° across the capacitor is the same for "0"-symbols as it is for "1"-symbols whenever the resonant circuit is in tune. This feature is explained in further detail in the following.

A digital bit stream may be transmitted wirelessly by subjecting the bit stream to an FSK modulation and then modulate the FSK modulated bit stream onto a carrier wave at a carrier frequency $f_c$, thereby generating an FSK signal for transmission comprising two distinct frequencies, $f_1$ and $f_2$ having the relationship $$f_1 = f_c + \frac{\delta f}{2} \text{ and } f_2 = f_c - \frac{\delta f}{2},$$

where δ is the frequency deviation from $f_c$ and $\delta f = f_1 - f_2$. In other words, $f_1$ and $f_2$ appears at equal distances from $f_c$. The FSK signal is then applied to a transmitter RLC circuit tuned to $f_c$ in order to broadcast the FSK signal wirelessly.

The transmitted, digital bit stream may then be detected and regenerated by a receiver by receiving and demodulating the FSK signal. To ensure proper reception and demodulation of the FSK signal an imperative requirement is that the frequency $f_c$ of the resonant circuit in the receiver is tuned to the transmitter carrier frequency $f_{c0}$ as closely as possible. The receiver carrier frequency $f_c$ may be measured directly, or it may be derived from a detectable property of the received FSK signal.

One property of a parallel resonant circuit including a capacitor and an inductor is that the impedance increases the closer an applied frequency is to the resonant frequency of the resonant circuit. Another property of a resonant circuit is that the phase angle difference of a signal applied to the resonant circuit is 90° at resonance. If the capacitor is split into a fixed capacitor and a variable capacitor, the resonant frequency of the resonant circuit may be altered by adjusting the value of the variable capacitor.

If a parallel resonant circuit is fed an FSK modulated signal at the resonant frequency, the phase angle difference across, say, the fixed capacitor will be 90°+θ whenever a "0"-symbol is transmitted and 90°−θ whenever a "1"-symbol is transmitted, since the FSK transmission comprises two distinct frequencies as stated in the foregoing. The phase angle difference θ is closely related to the frequency deviation δ and the Q of the resonator and represents the phase angle difference at the FSK frequencies $f_1$ and $f_2$, respectively. If the resonant frequency deviates from the frequency of the FSK modulated signal, such a deviation will manifest itself in a deviation in phase angle difference across the fixed capacitor. In the following, a deviation in phase angle difference is denoted Δθ in order to be able to detect and analyze the phase difference deviation for use in the automatic frequency control.

In a preferred embodiment, if the resonant frequency is lower than the frequency of the FSK modulated signal, the phase angle difference across the fixed capacitor of the resonant circuit will be 90°+θ+Δθ for a "0"-symbol, i.e. larger than the phase angle difference at resonance. However, if the resonant frequency is higher than the frequency of the FSK modulated signal, the phase angle difference across the fixed capacitor of the resonant circuit will be 90°+θ−Δθ for a "0"-symbol, i.e. smaller than the phase angle difference at resonance. Likewise, for a "1"-symbol, the phase angle difference will be 90°−θ+Δθ if the resonant frequency is lower than the frequency of the FSK modulated signal and 90°−θ−Δθ if the resonant frequency is higher than the frequency of the FSK modulated signal.

In a preferred embodiment, the means for adjusting the value of the variable capacitance comprises means for storing at least one value of the variable capacitance, means for comparing a present value of the variable capacitance against the at least one stored value of the variable capacitance, and means for controlling the time period between adjustments to the value of the variable capacitance based on the comparison.

This enables the tuning manager to suspend the tuning procedure for a predetermined period if the present value of the variable capacitance is equal to the stored value of the variable capacitance. In this way tuning is performed more rarely if the capacitance value has not changed since tuning was last performed. A scenario might be imagined where the FSK transceiver performs the tuning procedure initially when powered on for the first time, performs a series of repeated tuning procedures at short intervals while storing the value of the variable capacitor each time, checks the value of the variable capacitor against the stored value, and then increases the intervals where the tuning procedure is performed to e.g. once every hundred telegrams transmitted or so. Such a scenario implies that the tuning is monitored continuously, while the tuning is only readjusted if the value of the variable capacitor changes significantly, thus saving power and resources during execution of the tuning procedure.

According to a second aspect of the invention, a method for automatic tuning of the frequency of a resonant circuit of an FSK transceiver for a hearing aid is devised, wherein said resonant circuit comprises at least a fixed capacitor, a variable capacitor and an inductance, and wherein said method comprises the steps of providing an FSK modulated, digital bit stream for the resonant circuit, measuring a first phase difference corresponding to a first, binary symbol across the fixed capacitor, measuring a second phase difference corresponding to a second, binary symbol across the fixed capacitor, comparing the first phase difference to the second phase difference, and controlling the frequency of the resonant circuit by adjusting the value of the variable capacitor if the first phase difference differs from the second phase difference by more than a predetermined amount.

This method enables automatic tuning of the resonant circuit of an FSK transceiver in a fast and efficient manner without the need for external equipment. When the phase difference resulting from a "0"-symbol is compared with the phase difference resulting from a "1"-symbol, the result of the comparison is used directly as a means for determining how much the resonant circuit is out of tune, determining whether the frequency of the resonant circuit is too low or too high, and providing a corresponding adjustment value for the variable capacitor when necessary, thus adjusting the resonant frequency by altering the value of the variable capacitor. This simple method just requires the transmission of at least one "0"-symbol and at least one "1"-symbol in order to be able to perform tuning of the resonant circuit, and since the transmission of one single telegram typically comprises between 50 and 100 equally distributed binary symbols, the system performing the method of tuning the resonant circuit may have reached the capacitor value corresponding to the correct tuning frequency even before the transmission of a single telegram has ended.

BRIEF DESCRIPTION OF THE DRAWINGS

The invention will now be described in more detail with reference to the drawings, where.

DETAILED DESCRIPTION OF THE INVENTION

Figure 1:
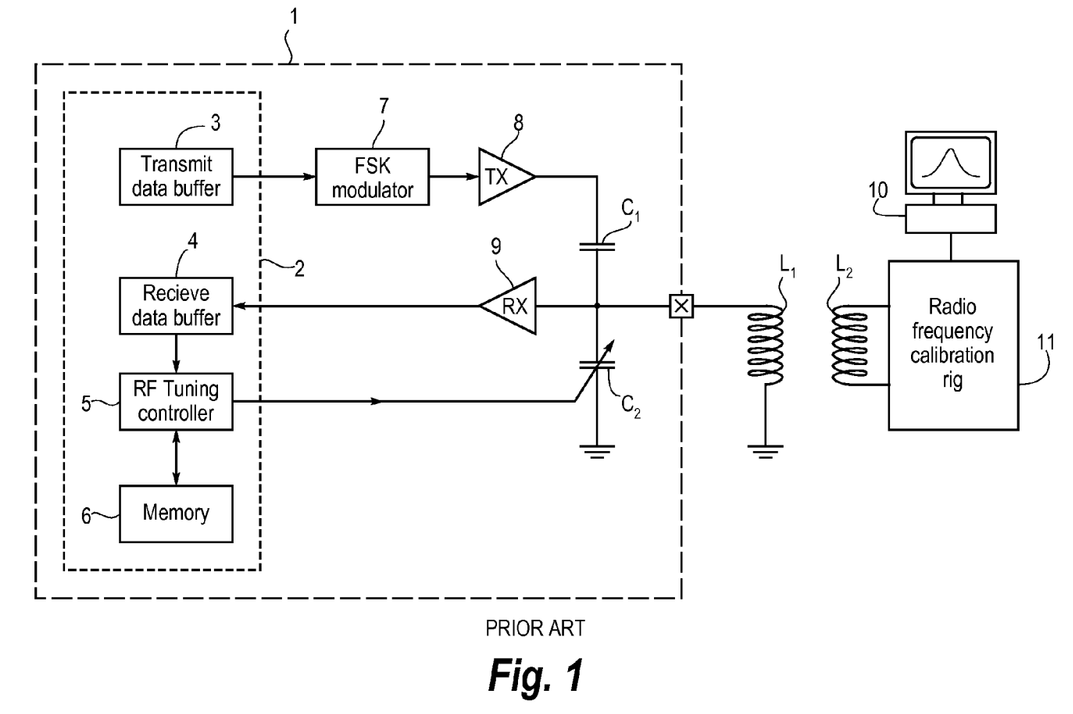
FIG. 1 is a block schematic illustrating an FSK transceiver for a hearing aid according to the prior art.

The block schematic in FIG. 1 illustrates a hearing aid FSK transceiver 1 according to the prior art. The FSK transceiver 1 comprises a digital controller 2, an FSK modulator 7, a transmission power amplifier 8, a low-noise reception amplifier 9, a fixed capacitor $C_1$, a variable capacitor $C_2$ and an antenna coil $L_1$, said coil being physically external to the FSK transceiver 1. The digital controller 2 comprises a transmission data buffer 3, a reception data buffer 4, a radio frequency tuning controller 5 and a memory 6. Also shown in FIG. 1 is a radio frequency calibration rig 11 controlled by a computer 10 and being capable of communicating with the transceiver 1 via the antenna coil $L_2$. The hearing aid (not shown) is assumed to be placed in a fixture in close proximity to the calibration rig 11 for the duration of the calibration procedure.

The transmission data buffer 3 and the reception data buffer 4 are adapted to communicate with the digital signal processing part of the hearing aid (not shown). The transmission data buffer 3 collects data for transmission on the digital interface (not shown) and feeds serial data to the FSK modulator 7. The FSK modulator 7 generates output signal for the transmission amplifier 8 and the amplified FSK modulated signal from the transmission amplifier 8, is modulated by a resonant circuit consisting of capacitor $C_1$, capacitor $C_2$ and antenna coil $L_1$ for wireless transmission. The tuning controller 5 has means for digitally adjusting the value of the capacitor $C_2$ according to instructions received from the calibration rig 11, and means for storing present capacitor values in the memory 6.

In the following discussion, wireless messages exchanged between the tuning calibration rig 11 and the hearing aid transceiver 1 via the antenna coils $L_1$ and $L_2$ are denoted telegrams. During execution of the tuning calibration procedure, the calibration rig 11 transmits an acknowledge telegram to the hearing aid transceiver 1. The hearing aid transceiver 1 responds to the acknowledge telegram by sending out an ID (identification) message telegram to the calibration rig 11.

The computer 10 instructs the calibration rig 11 to start the tuning calibration procedure, and the calibration rig 11 transmits an instruction telegram to the hearing aid transceiver 1 to enter a service mode. In the service mode, the hearing aid transceiver 1 permits the calibration rig 11 to perform adjustments to the value of the variable capacitor $C_2$ in order to tune the frequency of the resonant circuit of the transceiver.

The calibration rig 11, in a first pass, traverses the binary values of the capacitor $C_2$ in e.g. 8 steps at a time, from the lowest capacitor value to the highest capacitor value, and for each capacitor value the radiated, voltage transmitted from the hearing aid transceiver 1 is measured when the hearing aid (not shown) responds with an acknowledge telegram in order for the calibration rig 11 to generate an estimate of the range of capacitor values where the highest field strength is received from the hearing aid transceiver 1. The measurement values thus collected are stored the computer 10 in a table of binary capacitor values against field strengths.

In a second pass, the calibration rig 11 traverses every single binary capacitor value of $C_2$ from e.g. 20% below the value exhibiting the highest field strength in the first pass to e.g. 20% above that value, again measuring the field strength for every binary capacitor value set, storing the binary capacitor values against field strengths in the table during the second pass and selecting the binary capacitor value from the table which corresponds to the highest field strength at the conclusion of the calibration procedure. The two-pass method is employed in order to reduce calibration time while maintaining sufficient accuracy, ensuring that the exact capacitor value of $C_2$ corresponding to the highest field strength is found and stored in the memory 6 in the hearing aid transceiver 1 when the tuning frequency of the resonant circuit of the hearing aid transceiver 1 is calibrated. Once calibration has been performed, the calibration rig 11 stores the found capacitor value in the memory of the computer 10 alongside the hearing aid ID for later reference, and transmits a telegram to the hearing aid transceiver 1 releasing the hearing aid from service mode, thus allowing the hearing aid to resume normal operation with a calibrated transceiver tuning.

The prior art calibration procedure described in the foregoing is very accurate, but nevertheless suffers from a number of drawbacks, the largest drawback being the involvement of a dedicated calibration rig in order to ensure proper calibration of the transceiver frequency as a last step in manufacturing the hearing aid prior to shipping. The calibration of single hearing aid takes about 30 seconds, so if the FSK transceiver of the hearing aid was capable of calibrating itself and monitor its own transceiver frequency during normal use, the calibration rig could be dispensed with altogether, and time would obviously be saved during manufacturing of the hearing aid.

Figure 2:
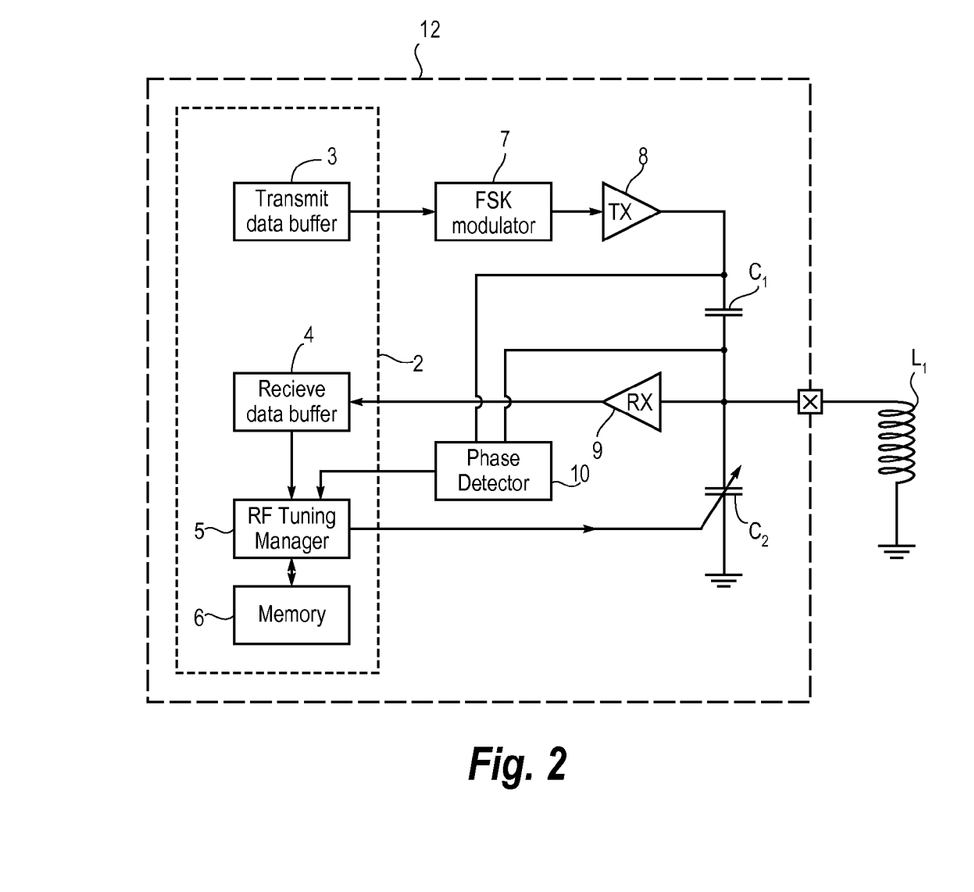
FIG. 2 is a block schematic illustrating the principle of automatic FSK transceiver tuning according to the invention.

FIG. 2 illustrates the tuning calibration principle of an FSK transceiver 12 for a hearing aid (not shown) according to the invention. The FSK transceiver 12 in FIG. 2 comprises a digital controller 2, an FSK modulator 7, a transmission power amplifier 8, a low-noise reception amplifier 9, a phase detector 10, a fixed capacitor $C_1$, a variable capacitor $C_2$ and an antenna coil $L_1$ external to the FSK transceiver 1. The digital controller 2 comprises a transmission data buffer 3, a reception data buffer 4, a radio frequency tuning manager 5 and a memory 6. The phase detector 10 has means (not shown) for detecting phase differences across the fixed capacitor $C_1$ and means for conveying information about the detected phase differences to the tuning manager 5.

The main difference between the FSK transceiver 12 according to the invention and the prior art FSK transceiver 1 is that the FSK transceiver 12 according to the invention has means for monitoring a phase shift of the FSK signal across the fixed capacitor $C_1$ and means for adjusting the variable capacitor $C_2$ accordingly, thus controlling the resonant frequency. The inventors have realized that if the phase difference across the fixed capacitor $C_1$ whenever a "0"-symbol is transmitted is of the same magnitude as whenever a "1"-symbol is transmitted, then the frequency of the resonant circuit is equal to the output frequency of the FSK modulator 7 which is controlled by the system clock (not shown), and the resonant circuit is therefore in tune.

During use, the FSK transceiver 12 receives telegrams from an external FSK transceiver (not shown) of similar configuration disposed e.g. in a remote control unit, the external FSK transceiver (not shown) differing from the FSK transceiver 12 in the hearing aid by maintaining the tuning of the frequency of its internal oscillator by means of a quartz crystal. The tuning of the external FSK transceiver frequency is thus very precise and less prone to drifting than a free-running oscillator. A quartz crystal is an impractical device to install in a hearing aid due to power and space considerations, but the frequency of the oscillator of the external FSK transceiver may nonetheless serve as a frequency reference for the FSK transceiver 12 of the hearing aid.

Whenever the FSK transceiver 12 of the hearing aid receives or transmits FSK signals, the resonant circuit of the FSK transceiver, consisting of $C_1$, $C_2$ and $L_1$, oscillates at a frequency determined by the values of $C_1$, $C_2$ and $L_1$. When receiving FSK signals, the FSK transceiver 12 either detects the frequency $f_1$ or the frequency $f_2$, as described in the foregoing. When the frequency $f_1$ is detected, the phase difference across the fixed capacitor $C_1$ has the value $\theta_{f1}$, and when the frequency $f_2$ is detected, the phase difference across the fixed capacitor $C_1$ has the value $\theta_{f2}$. For symmetry reasons, and because the value of the capacitor $C_1$ is fixed, the phase difference $\theta_{f1}$ equals the phase difference $\theta_{f2}$ whenever the frequency of the resonant circuit is in tune.

The FSK transceiver 12 according to the invention utilizes the phase detector 10 to derive the phase differences $\theta_{f1}$ and $\theta_{f2}$, respectively, as detected across the fixed capacitor $C_1$, from the received FSK signal. By storing the phase differences $\theta_{f1}$ and $\theta_{f2}$ temporarily in the phase detector 10 and using the tuning manager 5 to compare the value of the phase difference $\theta_{f1}$ to the value of the phase difference $\theta_{f2}$, the tuning manager 5 is capable of detecting a possible deviation between the two phase differences and performing adjustments to the value of the variable capacitor $C_2$ in cases where the phase differences are mutually unequal. Since a discrepancy between the two phase differences is the result of the resonant circuit frequency $f_c$ being out of tune with the carrier frequency $f_{c0}$ and a change in the value of the variable capacitor $C_2$ results in a change in the resonant circuit frequency. An adequate adjustment eventually results in the measured phase differences being of equal magnitude, and the resonant circuit frequency $f_c$ thus being equal to $f_{c0}$.

Figure 3:
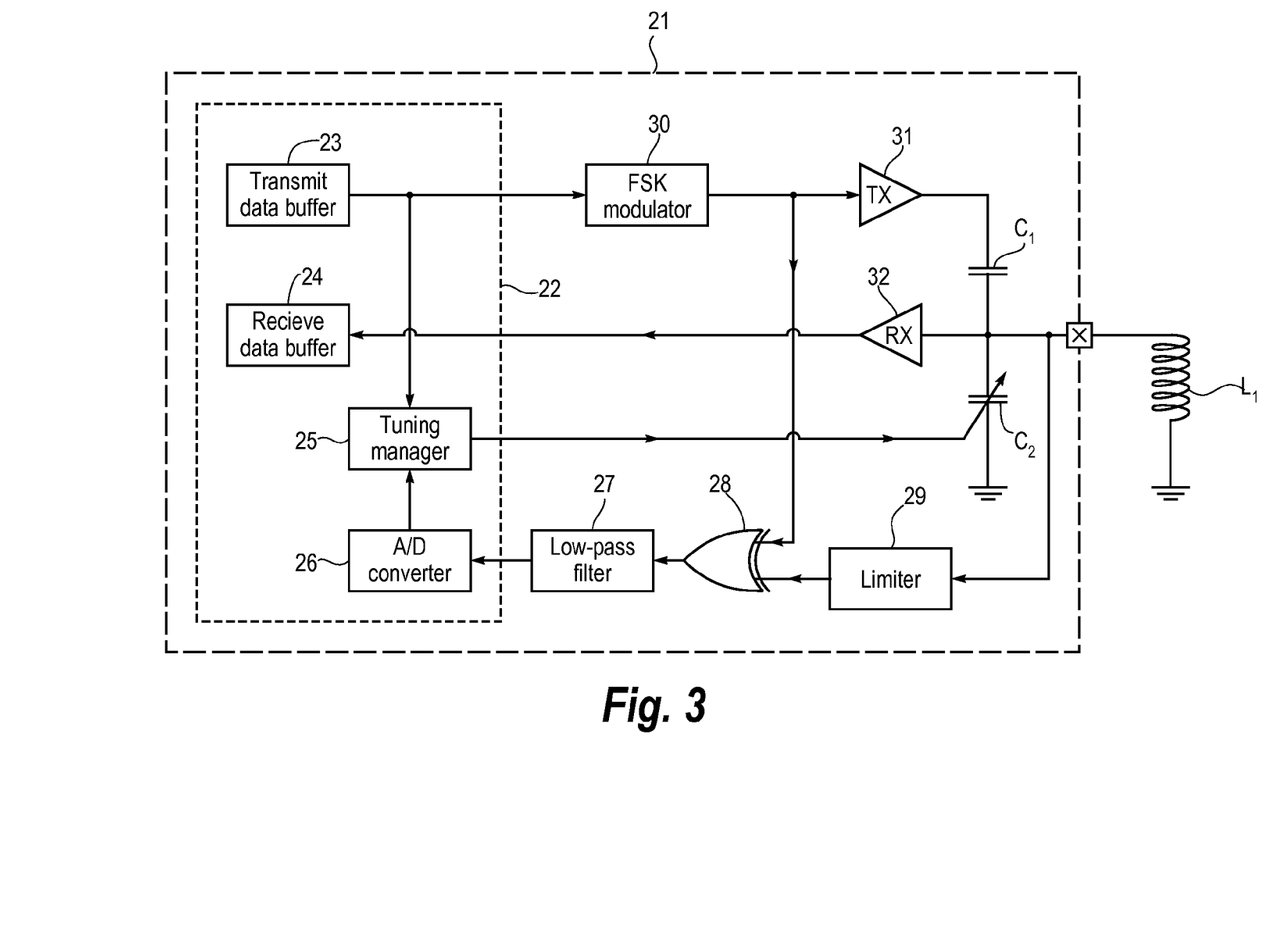
FIG. 3 is a block schematic illustrating an embodiment of an FSK transceiver for a hearing aid according to the invention.

FIG. 3 illustrates an embodiment of an FSK transceiver 21 for a hearing aid (not shown) according to the invention. This embodiment shows the implementation of a practical phase difference detector. The FSK transceiver 21 comprises a digital controller 22, an FSK modulator 30, a power amplifier 31, a low-noise amplifier 32, a limiter 29, an XOR gate 28, a low-pass filter 27, a fixed capacitor $C_1$, a variable capacitor $C_2$, and an external antenna coil $L_1$. The digital controller 22 comprises an A/D converter 26, a tuning manager 25, a reception data buffer 24 and a transmission data buffer 23.

In the embodiment of the FSK transceiver 21 according to the invention, the means for measuring the phase shift across the fixed capacitor $C_1$ consists of the limiter 29, the XOR gate 28, the low-pass filter 27, and the A/D converter 26; and the means for adjusting the variable capacitor $C_2$ consists of the tuning manager 25. The FSK transceiver 21 measures the phase shift across $C_1$ by taking the output signal from the FSK modulator 30 and feeding it to a first input of the XOR gate 28, and taking the output signal presented to the antenna coil $L_1$ and feeding it through the limiter 29 and to a second input of the XOR gate 28. The output signal from the FSK modulator 30 is a digital signal by nature, but the output signal presented to the antenna coil $L_1$ needs to be conditioned by the limiter 29 in order to be properly detected by the XOR gate 28. The power amplifier 31 is considered to be a linear amplifier with a high bandwidth, and does not affect the phase of the output signal from the FSK modulator 30 significantly.

Whenever the output signal from the FSK modulator 30 has the opposite phase of the output signal of the limiter 29, the output signal from the XOR gate 28 is logical HIGH. The reaction time of the XOR gate 28 is comparatively nil in relation to the shifting rate of the FSK demodulator 30. Therefore the XOR gate 28 generates pulses of a first, specific duration whenever the FSK modulator 30 outputs a "0"-symbol and pulses of a second, specific duration whenever the FSK modulator 30 outputs a "1"-symbol. The pulses output from the XOR-gate 28 are filtered by the low-pass filter 27, essentially generating an analog voltage proportional to the duration of the pulses output by the XOR gate 28.

The voltage output by the low-pass filter 27 is used as an input signal to the A/D converter 26, and the output from the A/D converter 26 is a digital number corresponding to the phase difference measured across the fixed capacitor $C_1$. The digital number output by the A/D converter 26 is used by the tuning manager to determine the phase shift across the fixed capacitor $C_1$. The tuning manager 25 then compares the digital number generated whenever a "1"-symbol is transmitted against the digital number generated whenever a "0"-symbol is transmitted and uses the result of the comparison to adjust the tuning frequency of the resonant circuit in a manner to be explained more closely in the following.

An FSK signal has a signal portion having a lower frequency $f_0$ at a predetermined frequency distance lower than the carrier frequency $f_{c0}$ and signal portion having a higher frequency $f_1$ at a predetermined frequency distance higher than the carrier frequency $f_{c0}$. The FSK modulation is symmetrical, i.e. the frequency distance between the carrier frequency $f_{c0}$ and the lower symbol frequency $f_0$ is the same as the frequency distance between the carrier frequency $f_{c0}$ and the higher symbol frequency $f_1$. By convention, the lower frequency $f_0$ is used to represent the "0"-symbol and the higher frequency $f_1$ is used to represent the "1"-symbol.

At the carrier frequency $f_{c0}$, the phase shift across the fixed capacitor $C_1$ is 90° when the resonant circuit is in tune. At the same time, the phase shift across $C_1$ at the frequency $f_0$ is $\theta$ degrees above 90°, and the phase shift across $C_1$ at the frequency $f_1$ is $\theta$ degrees below 90° due to the symmetry. If the frequency $f_c$ of the resonant circuit is lower than $f_{c0}$, the phase shift across $C_1$ at the frequency $f_0$ becomes larger, and the phase shift across $C_1$ at the frequency $f_1$ becomes smaller. However, if the frequency $f_c$ of the resonant circuit is higher than $f_{c0}$, the phase shift across $C_1$ at the frequency $f_0$ becomes smaller, and the phase shift across $C_1$ at the frequency $f_1$ becomes larger.

Figure 4:
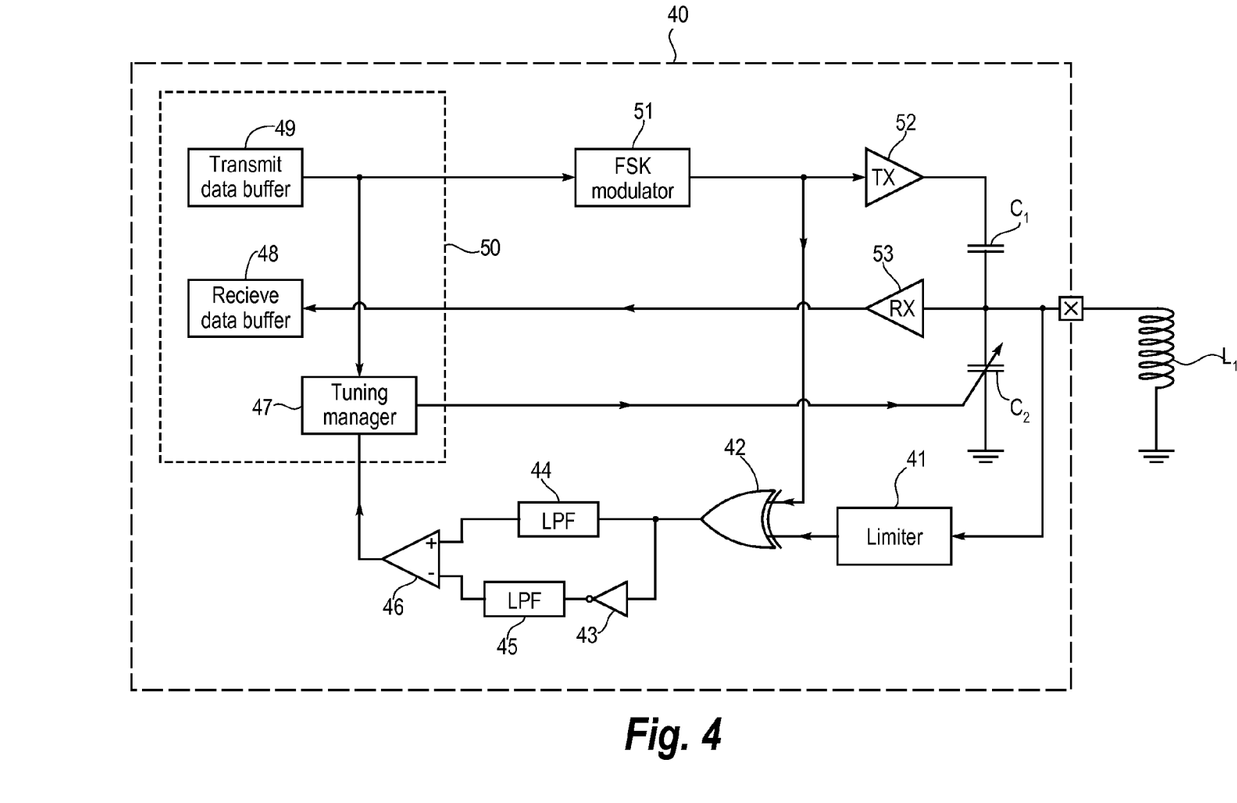
FIG. 4 is a block schematic illustrating an alternative embodiment of an FSK transceiver for a hearing aid according to the invention.

FIG. 4 illustrates another embodiment of an FSK transceiver 40 for a hearing aid (not shown) according to the invention. The embodiment shows an alternative implementation of a practical phase difference detector for use with the invention. The FSK transceiver 40 comprises a digital controller 50, an FSK modulator 51, a power amplifier 52, a low-noise amplifier 53, a limiter 41, an XOR gate 42, an inverter 43, a first low-pass filter 44, a second low-pass filter 45, a comparator 46, a fixed capacitor $C_1$, a variable capacitor $C_2$, and an external antenna coil $L_1$. The digital controller 50 comprises a tuning manager 47, a reception data buffer 48 and a transmission data buffer 49.

In this embodiment of the FSK transceiver 50 the means for measuring the phase shift across the fixed capacitor $C_1$ consists of the limiter 41, the XOR gate 42, the inverter 43, the first low-pass filter 44, the second low-pass filter 45 and the comparator 46; and the means for adjusting the variable capacitor $C_2$ consists of the tuning manager 47. The FSK transceiver 50 measures the phase shift across $C_1$ by taking the output signal from the FSK modulator 51 and feeding it to a first input of the XOR gate 42 and taking the output signal presented to the antenna coil $L_1$ and feeding it through the limiter 41 and to a second input of the XOR gate 42. As in the configuration shown in FIG. 3, the output signal from the FSK modulator 51 is a digital signal, whereas the output signal presented to the antenna coil $L_1$ must be conditioned by the limiter 41 in order to be properly detected by the XOR gate

42. This embodiment requires either that the output pulses from the FSK modulator 51 has an even distribution of "1"-symbols and "0"-symbols or that the FSK modulator 51 operates directly at the desired transmission frequency, but is otherwise easily implemented.

Whenever the output signal from the FSK modulator 51 has the opposite phase of the output signal of the limiter 41, the output signal from the XOR gate 42 is logical HIGH. The reaction time of the XOR gate 42 is comparatively nil in relation to the shifting rate of the FSK demodulator 51. Therefore the XOR gate 42 generates pulses of a first, specific duration whenever the FSK modulator 51 outputs a "0"-symbol and pulses of a second, specific duration whenever the FSK modulator 51 outputs a "1"-symbol. The pulses output from the XOR-gate 42 are presented to the input of the inverter 43 and the input of the first low-pass filter 44, respectively, and the output signal from the inverter 43 is used as an input signal for the second low-pass filter 45. The output signal from the first low-pass filter 44 is presented to a positive input of the comparator 46, and the output signal from the second low-pass filter 45 is presented to a negative input of the comparator 46. The output from the comparator 46 is fed to an input of the tuning manager 47.

During use, the XOR-gate 42 outputs pulses corresponding to the phase difference measured across the fixed capacitor $C_1$. The first low-pass filter 44 uses the pulses output from the XOR-gate 42 directly and produces a first output voltage proportional to the phase difference across the fixed capacitor $C_1$ whenever "1"-symbols are transmitted. This voltage is used as the positive input of the comparator 46. The second low-pass filter 45, on the other hand, uses the output from the inverter 43 to present an inverted version of the pulses output from the XOR-gate 42 to produce a second output voltage proportional to the phase difference across the fixed capacitor $C_1$ whenever "0"-symbols are transmitted. This voltage is used as the negative input of the comparator 46.

Whenever the oscillator is in tune, the phase difference values of the "0"-symbols and the "1"-symbols are equal. The output voltage from the first low-pass filter 44 is thus equal to the output voltage from the second low-pass filter 45, and the output voltage from the comparator 46 is therefore zero volts, which is interpreted by the tuning manager 47 of the digital controller 50 as an indication of the oscillator being in tune.

If the voltage output from the comparator 46 is positive, then the phase difference corresponding to $f_1$ is greater than the phase difference corresponding to $f_0$, as stated above, and the oscillator frequency is too high. In this case the tuning manager 47 compensates by increasing the value of the variable capacitor $C_2$ in order to decrease the oscillator frequency. If, on the other hand, the voltage output from the comparator 46 is negative, then the phase difference corresponding to $f_1$ is smaller than the phase difference corresponding to $f_0$, and the oscillator frequency is too low. In this case the tuning manager 47 compensates by decreasing the value of the variable capacitor $C_2$ in order to increase the oscillator frequency.

This embodiment may be preferred over the embodiment shown in FIG. 3 due to the fact that no A/D converter is needed. The low-pass filters 44 and 45 need a sufficiently long series of pulses in order to be able to settle to sufficiently precise voltages for the tuning manager 47 to perform a reliable detection of a tuning deviation, but this is easily achieved during the transmission of one or two telegrams having a length of e.g. 128 bit.

Figure 5A:
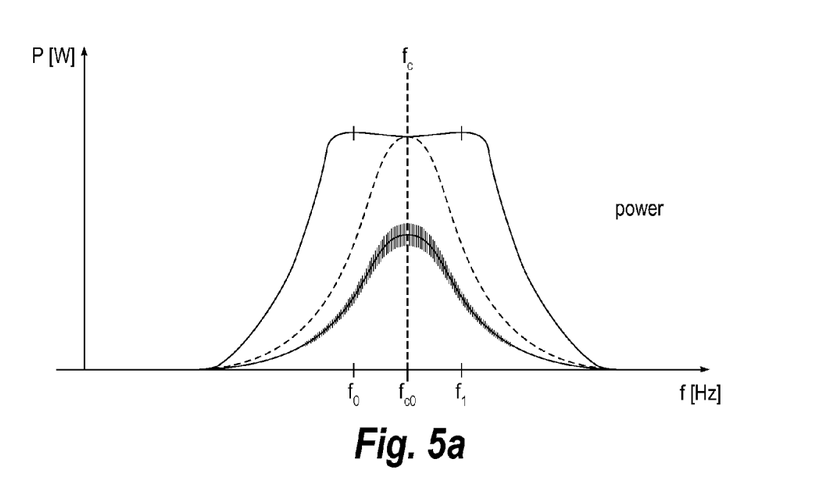
FIG. 5a is a graph illustrating the power relationship of an FSK signal near resonance.
Figure 5B:
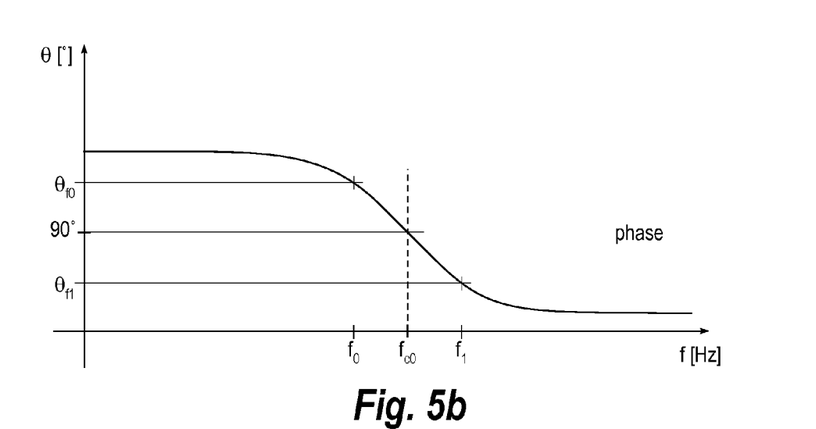
FIG. 5b is a graph illustrating the phase relationship of an FSK signal near resonance.

The graphs in FIGS. 5a and 5b illustrates the coherence between the transmitted power of an FSK signal and the corresponding phase difference of the resonant circuit of the FSK transceiver shown in FIG. 3. FIG. 5a illustrates the transmission power of the FSK transceiver, and FIG. 5b illustrates the corresponding phase relationship of the FSK transceiver. In FIGS. 5a and 5b, $f_c$ indicates the frequency of the resonant circuit, $f_{c0}$ indicates the target transmission frequency, and $f_0$ and $f_1$ indicates the FSK frequencies generated by the FSK modulation of the bit stream.

In FIG. 5b, the phase angles $\theta_{f0}$ and $\theta_{f1}$ are the phase angle differences corresponding to the frequencies $f_0$ and $f_1$, respectively. It is evident from FIG. 5b that the phase distance between 90° and $\theta_{f0}$ is equal to the phase distance between 90° and $\theta_{f1}$ when the resonant frequency $f_c$ of the resonant circuit is equal to the target transmission frequency $f_{c0}$. This fact is exploited by the invention.

By comparing the phase shift across $C_1$ whenever a "0"-symbol or a "1"-symbol is transmitted, respectively, the tuning manager 25 of the FSK transceiver 21 of the hearing aid according to the invention may determine if the tuning frequency $f_c$ of the resonant circuit of the FSK transceiver 21 is too high or too low with respect to the desired carrier frequency $f_{c0}$. This knowledge is then utilized by the tuning manager 25 to adjust the value of the variable capacitor $C_2$ according to an adjustment scheme discussed in further detail in the following with reference to FIG. 6a, FIG. 6b and FIG. 6c.

Figure 6A:
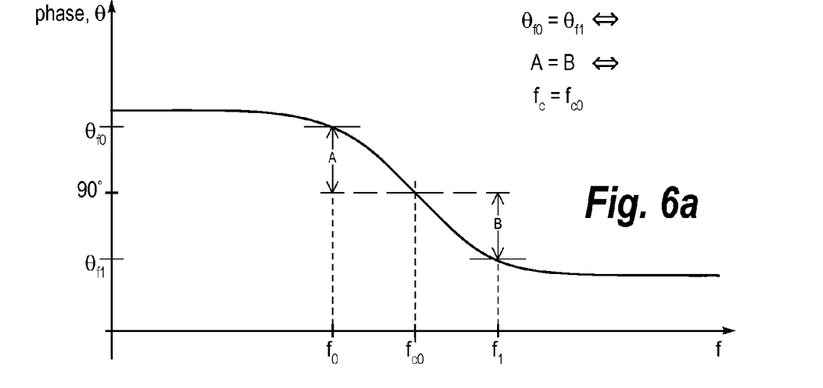
FIG. 6a is a graph illustrating the phase-frequency relationship of an FSK signal at resonance frequency in the embodiment of an FSK transceiver shown in FIG. 3.

FIG. 6a illustrates the phase-frequency relationship of the resonant circuit of the FSK transceiver 21. The graph has frequency (f) depicted on the abscissa and the measured phase shift ($\theta$) across the fixed capacitor $C_1$ of FIG. 3 depicted on the ordinate. According to the graph the measured phase shift is higher than 90° at frequencies below $f_{c0}$, and at frequencies above $f_{c0}$, the measured phase shift is lower than 90°. At resonance, the resonant frequency $f_c$ is equal to the FSK carrier frequency $f_{c0}$, and at this point the phase shift $\theta_0$ across the fixed capacitor $C_1$ of the FSK transceiver 21 is exactly 90°. At the lower frequency $f_0$, the phase shift $\theta_{f0}$-90° equals the phase distance A degrees, and at the higher frequency $f_1$, the phase shift 90°-$\theta_{f1}$ equals the phase distance B degrees. From FIG. 6a it is evident that the phase distances A and B are equally large, and thus the resonant frequency $f_c$ is equal to $f_{c0}$.

Figure 6B:
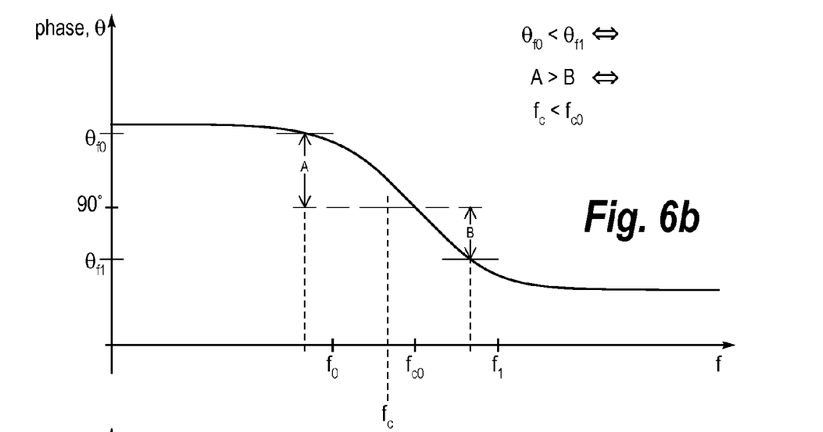
FIG. 6b is a graph illustrating the phase-frequency relationship of the FSK signal in FIG. 5a at a frequency below resonance.

In FIG. 6b, the resonant frequency $f_c$ is lower than the FSK carrier frequency $f_{c0}$. At the lower frequency $f_0$, the phase shift $\theta_{f0}$-90° equals the phase distance A degrees, and at the higher frequency $f_1$, the phase shift 90°-$\theta_{f1}$ equals the phase distance B degrees. FIG. 6b shows that the phase distance A is larger than the phase distance B, and thus the resonant frequency $f_c$ is lower than $f_{c0}$.

Figure 6C:
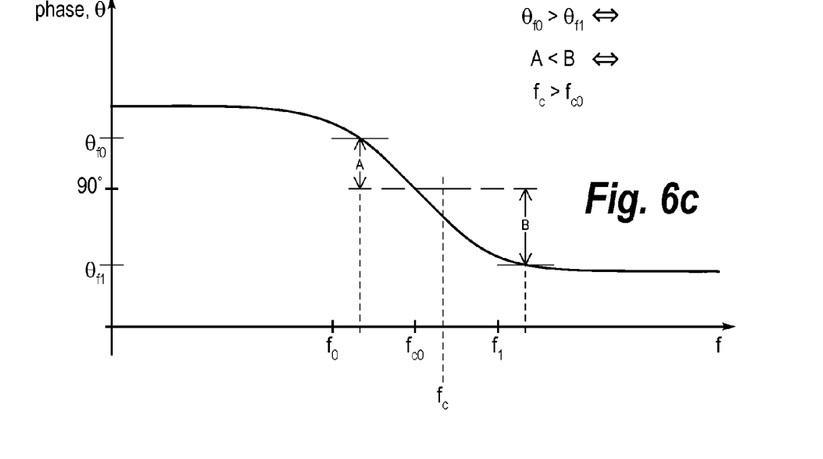
FIG. 6c is a graph illustrating the phase-frequency relationship of the FSK signal in FIG. 5a at a frequency above resonance.

In FIG. 6c, the resonant frequency $f_c$ is higher than the FSK carrier frequency $f_{c0}$. As in FIG. 6a and FIG. 6b, at the lower frequency $f_0$, the phase shift $\theta_{f0}$-90° equals the phase distance A degrees, and at the higher frequency $f_1$, the phase shift 90°-$\theta_{f1}$ equals the phase distance B degrees. FIG. 6c shows that the phase distance A is smaller than the phase distance B, and thus the resonant frequency $f_c$ is higher than $f_{c0}$.

From FIGS. 5a, 5b and 5c may be learned that by comparing the phase shift distance A detected at the lower frequency $f_0$ with the phase shift distance B detected at the higher frequency $f_1$, the relationship between the resonant frequency $f_c$ and the carrier frequency $f_{c0}$ may be deduced by the tuning manager 25 by comparing the magnitudes of the phase distances A and B, and appropriate actions may be taken to improve tuning of the resonant circuit.

If, for instance, a comparison of the phase shift distances A and B reveals that the phase shift distance A is larger than the phase shift distance B, then the resonant frequency $f_c$ is smaller than the carrier frequency $f_{c0}$. The tuning manager 25, performing its tuning routine, may then increase the frequency $f_c$ by decreasing the value of the variable capacitor $C_2$ by a small amount, compare the phase shift distances A and B again, and then repeat the adjustment until the difference between A and B is sufficiently close to zero degrees, the difference between $f_c$ and $f_{c0}$ thus being below a predetermined, smallest difference.

On the other hand, if a comparison of the phase shift distances A and B reveals that the phase shift distance A is smaller than the phase shift distance B, then the resonant frequency $f_c$ is larger than the carrier frequency $f_{c0}$. In this case the tuning manager 25 may decrease the frequency $f_c$ by increasing the value of the variable capacitor $C_2$ by a small amount, and compare the phase shift distances A and B again, repeating the adjustment until the difference between A and B is sufficiently close to zero degrees, the difference between $f_c$ and $f_{c0}$ thus being below a predetermined, smallest difference. An FSK transceiver for a hearing aid typically transmits telegrams containing binary bit streams of e.g. 128 bits per telegram, the bit streams comprising both ones and zeroes. A bit stream of this length is transmitted e.g. every time an acknowledge telegram is sent. Since the tuning manager 25 needs only one "0"-symbol and one "1"-symbol in order to assess the tuning status of the resonant circuit, one single transmission is usually more than adequate for the tuning manager 25 to be able to perform tuning of the frequency $f_c$ to a precision within one step of the variable capacitor $C_2$.

In a preferred embodiment, the hearing aid FSK transceiver 21 may perform a complete tuning calibration every time the hearing aid is turned on, and the tuning manager 25 then monitors the resonant frequency $f_c$ during use, e.g. collecting statistic information during use and performing a recalibration of the frequency $f_c$ once every thousand transmissions or so. If the bit rate of the FSK transceiver 21 is 20 kbit/second, a typical transmission has a duration of between 5 and 10 milliseconds, and the tuning manager 25 will have attained proper tuning of the resonant circuit before the transmission has ended.

In a preferred embodiment, the carrier frequency of the FSK transceiver is selected to be 10.0 MHz. A suitably selective FSK radio transceiver may have an effective bandwidth of, e.g. 600 kHz, and the adjustment range of the resonant circuit is therefore from 9.4 MHz to 10.6 MHz. This range must be covered by the variable capacitor $C_2$ in the FSK transceiver 21. If a stepped capacitor having e.g. 8 bits is used for $C_2$, 256 possible, discrete capacitor values may be obtained. If it is assumed that the individual steps of discrete capacitor values are equidistantly distributed throughout the variable operating range of the capacitor, and that the phase shift equilibrium lies approximately in the middle of the capacitor range, i.e. at the digital capacitor value of 128, then the frequency of the FSK transceiver may be adjusted within a tolerance of around 400 Hz.

Figure 7:
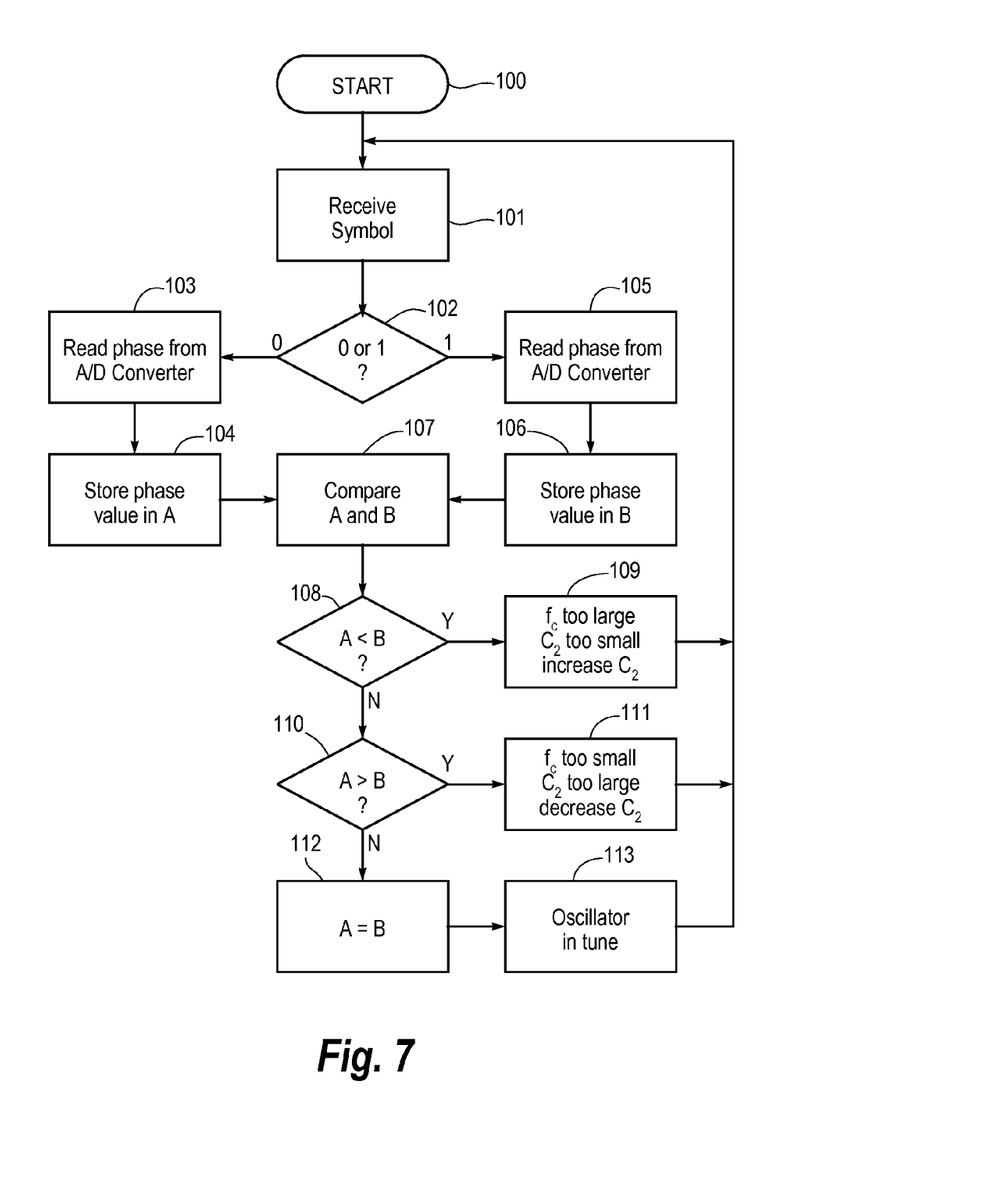
FIG. 7 is a flowchart illustrating an automatic tuning procedure employed by the FSK transceiver in FIG. 3.

The flowchart in FIG. 7 illustrates an embodiment of a tuning algorithm executed by the tuning manager 25 in FIG. 3. The algorithm initializes in step 100 when a tuning request is issued to the tuning manager 25 by the hearing aid controller. A binary symbol is received from the transmission data buffer 23 and decoded in steps 101 and 102. If the symbol is a "0", the phase difference across $C_1$ is read from the A/D converter 26 in step 103 and stored in the variable A in step 104. If, on the other hand, the symbol is a "1", the phase difference across $C_1$ is read from the A/D converter 26 in step 105 and stored in the variable B in step 106. The tuning manager 25 compares the phase difference values stored in the variables A and B in step 107 and tests the result of the comparison in steps 108 and 110.

In step 108 a test is performed to estimate if the phase difference value for a "0" is smaller than the phase difference value for a "1". If this is the case, the tuning manager 25 concludes that the resonating frequency fc is too high, and therefore the value of $C_2$ is too small. Consequently, the tuning manager 25 issues a command to increase the value of $C_2$ in step 109, and the algorithm loops back to step 101 in order to wait for the next symbol. If this is not the case, the algorithm continues to step 110.

In step 110 a test is performed to estimate if the phase difference value for a "0" is larger than the phase difference value for a "1". If this is the case, the tuning manager 25 concludes that the resonating frequency fc is too low, and therefore the value of $C_2$ is too large. Consequently, the tuning manager 25 issues a command to decrease the value of $C_2$ in step 111, and the algorithm loops back to step 101 in order to wait for the next symbol. If this is not the case, the algorithm continues to step 112.

If the algorithm reaches step 112, the tuning manager 25 concludes that the phase difference value for a "0" is equal to the phase difference value for a "1" and the resonating frequency therefore is in tune. The algorithm then continues unconditionally to step 113, sets a flag indicating that the resonating frequency is in tune, stores the value of $C_2$ in memory and loops back to step 101 in order to wait for the next symbol.

The tuning manager 25 executes the algorithm in FIG. 7 every time a symbol is received from the transmission data buffer 23. However, in a preferred embodiment, the tuning manager 25 may suspend the tuning algorithm if no adjustments have been made to the value of $C_2$ by the tuning manager 25 for, say, ten consecutive, binary symbols. The tuning manager 25 then enters an idle state, counting the number of symbols transmitted by the transmission data buffer 23 and then executing the tuning algorithm e.g. once every one thousand transmitted symbols or so in order to keep monitoring the tuning stability of the resonant circuit. This preferred embodiment saves power and resources in the hearing aid circuit while controlling the tuning frequency of the FSK transceiver.

We claim:

1. A frequency-shift-keying (FSK) transceiver for use in a hearing aid, said transceiver having a resonant circuit comprising at least a fixed inductance, a fixed capacitance and a variable capacitance, wherein the transceiver comprises:
   an FSK modulator,
   a transmitting amplifier,
   a receiving amplifier, and
   means for controlling the tuning frequency of the resonant circuit to a desired frequency,
   said tuning means comprising a phase difference detector and a tuning manager,
   the phase difference detector being adapted for measuring the phase difference across the fixed capacitance,
   the tuning manager comprising
   means for receiving symbols from a transmission data buffer,
   means for receiving measured phase differences from the phase difference detector,
   means for comparing a first phase difference corresponding to a first, received symbol with a second phase difference corresponding to a second, received symbol and
   means for adjusting the value of the variable capacitance according to the difference between the first phase difference and the second phase difference in order to control the tuning frequency of the resonant circuit.

2. The FSK transceiver according to claim 1, wherein the phase difference detector comprises a limiter, a logical XOR gate, a low-pass filter and an analog-to-digital converter for providing a measure of phase difference corresponding to a symbol transmitted to the tuning manager.

3. The FSK transceiver according to claim 1, wherein the phase difference detector comprises a limiter, a logical XOR gate, a first low-pass filter, an inverter, a second low-pass filter and a comparator for providing a measure of phase difference corresponding to a symbol transmitted to the tuning manager.

4. The FSK transceiver according to claim 1, wherein the means for adjusting the value of the variable capacitance comprises means for storing at least one value of the variable capacitance, means for comparing a current value of the variable capacitance with the at least one stored value of the variable capacitance, and means for controlling the time period between adjustments to the value of the variable capacitance based on the comparison.

5. A method for automatic tuning of the frequency of a resonant circuit of a frequency shift keying (FSK) transceiver for a hearing aid, said resonant circuit comprising at least a fixed capacitor, a variable capacitor and an inductance, wherein said method comprises the steps of:
providing an FSK modulated digital bit stream for the resonant circuit,
measuring a first phase difference corresponding to a first, binary symbol across the fixed capacitor,
measuring a second phase difference corresponding to a second, binary symbol across the fixed capacitor, comparing the first phase difference to the second phase difference, and
controlling the frequency of the resonant circuit by adjusting the value of the variable capacitor when the first phase difference differs from the second phase difference by more than a predetermined amount.

6. The method according to claim 5, wherein the steps of measuring phase differences across the fixed capacitor involves the steps of performing an XOR function on a logic level of a first terminal of the fixed capacitor and a logic level of a second terminal of the fixed capacitor, low-pass filtering the resulting output signal from the XOR function to obtain a voltage signal, and converting the low-pass filtered voltage signal into a digital signal representing the measured phase difference.

7. The method according to claim 5, wherein the step of comparing the first phase difference to the second phase difference incorporates the steps of reading and storing a first phase difference when the first binary symbol is present, reading and storing a second phase difference when the second binary symbol is present, and generating a control output signal for the variable capacitor dependent on the difference between the first stored phase difference and the second stored phase difference.

8. The method according to claim 7, wherein the control output signal for the variable capacitor is increased when the first stored phase difference is smaller than the second stored phase difference.

9. The method according to claim 7, wherein the control output signal for the variable capacitor is decreased when the first stored phase difference is larger than the second stored phase difference.

10. The method according to claim 7, wherein the control output signal for the variable capacitor is kept unaltered when the difference between the first stored phase difference and the second stored phase difference is smaller than a predetermined minimum difference.

* * * * *